United States Patent [19]

Young

[11] 3,801,898

[45] Apr. 2, 1974

[54] DC BUS RESISTIVE PATH TO GROUND FAULT DETECTOR

[75] Inventor: John A. Young, Peterborough, Ontario, Canada

[73] Assignee: Canadian General Electric Company, Limited, Toronto, Ontario, Canada

[22] Filed: Mar. 22, 1972

[21] Appl. No.: 236,940

[30] Foreign Application Priority Data
June 16, 1971  Canada.................................. 115747

[52] U.S. Cl................................... 324/51, 340/255
[51] Int. Cl............................................ G01r 31/02
[58] Field of Search ...... 324/51, 133; 340/248, 253, 340/255; 307/236

[56] References Cited
UNITED STATES PATENTS

| | | | |
|---|---|---|---|
| 2,700,125 | 1/1955 | King et al. ...................... | 340/255 X |
| 3,619,775 | 11/1971 | Naylor............................. | 324/133 X |
| 3,382,377 | 5/1968 | Huffman et al..................... | 307/236 |
| 3,194,982 | 7/1965 | Bentley........................... | 307/236 X |
| 2,989,694 | 6/1961 | Fath et al......................... | 324/51 |
| 3,377,552 | 4/1968 | Baum.............................. | 324/51 |
| 2,022,758 | 12/1935 | Corderman........................ | 340/255 |
| 3,641,546 | 2/1972 | Blackburn........................ | 340/248 A |
| 3,586,975 | 6/1971 | Coluson........................... | 324/133 |
| 3,550,018 | 12/1970 | James et al. ...................... | 307/236 X |
| 2,993,172 | 7/1961 | Karlicek.......................... | 324/133 |

*Primary Examiner*—Gerard R. Strecker
*Attorney, Agent, or Firm*—Arnold E. Renner; Harold H. Green, Jr.

[57] ABSTRACT

A detector for indicating a resistive path to ground fault on either bus of a pair of ungrounded DC buses conducting electric power to a load. The detector includes one gate circuit for each bus. A positive DC bias signal applied to the gate circuit for the positive bus maintains this circuit in one mode of operation during the absence of a fault on either bus; a negative DC bias signal applied to the gate circuit for the negative bus maintains this circuit in a second mode of operation during the absence of a fault on either bus. The voltages on the buses are compared in a simple resistor network. Whenever these voltages become imbalanced because of a resistive path to ground fault on either bus, a signal from the network, proportional to the imbalance and applied to the gate circuits, will switch the circuit for the faulted bus to the other mode of operation. This switching is annunciated to indicate a fault occurrence as well as the faulted bus.

6 Claims, 3 Drawing Figures

PATENTED APR 2 1974　　3,801,898

DC BUS RESISTIVE PATH TO GROUND FAULT DETECTOR

BACKGROUND OF THE INVENTION

The present invention relates generally to fault detection and more particularly to circuitry for detecting and indicating a resistive path to ground on either bus of a pair of ungrounded DC buses conducting electric power to a load.

Bus ground fault detectors have taken many forms in the past. Detectors either using the bus voltages available or adding another voltage to the bus voltages for measuring the imbalance between these voltages caused by a resistive path to ground on either bus are available. One disadvantage with the latter type of detectors, of course, is that adding another voltage to the bus voltages may put undesirable stress on the load insulation.

SUMMARY OF THE INVENTION

The present invention provides a unique detector which, using either a digital or an analog mode of sensing imbalance, will indicate development of a resistive path to ground fault using merely the bus voltages available. The detector includes one gate circuit for each bus. Positive and negative DC bias signals are applied to the gate circuits for the positive and the negative buses respectively to maintain each circuit in a different one of two modes of operation during the absence of a fault on either bus. The voltages on the buses are compared in a simple resistor network. Whenever these voltages become imbalanced because of a ground fault, i.e., a resistive path to ground on either bus, a signal from the network, proportional to the imbalance and applied to the gate circuits, will switch the circuit for the faulted bus to the other mode of operation. This switching is annunciated to indicate a fault occurrence as well as the faulted bus.

Other features of this invention will be apparent from the following description accompanied by the drawings.

DETAILED DESCRIPTION

Figure 1:
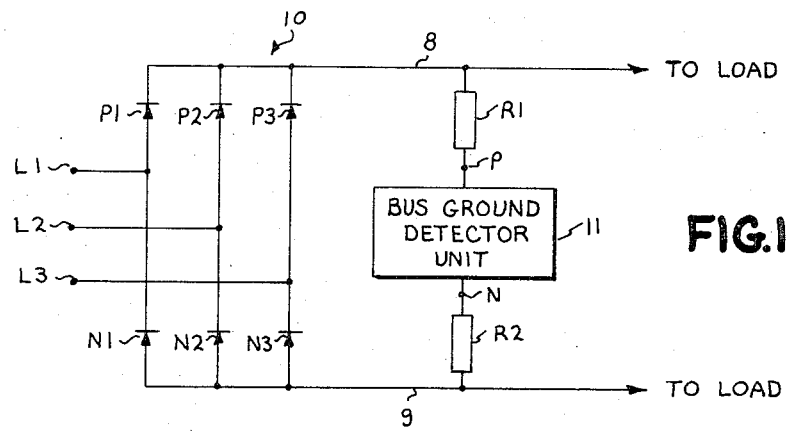
FIG. 1 is a basic schematic illustrating the relationship of the detector of the present invention to other components in a typical DC electric power system.

In FIG. 1 a converter bridge 10 consisting of three positive cells P1 through P3 and three negative cells N1 through N3 is illustrated receiving three phase ac voltage on lines L1 through L3 and supplying a DC voltage to a load. A detector 11 is shown connected to terminals P and N which in turn are connected through respective voltage-dropping resistors R1 and R2 to the ungrounded positive and negative DC buses 8 and 9 respectively. Resistors R1 and R2 may not, of course, be necessary.

Figure 2:
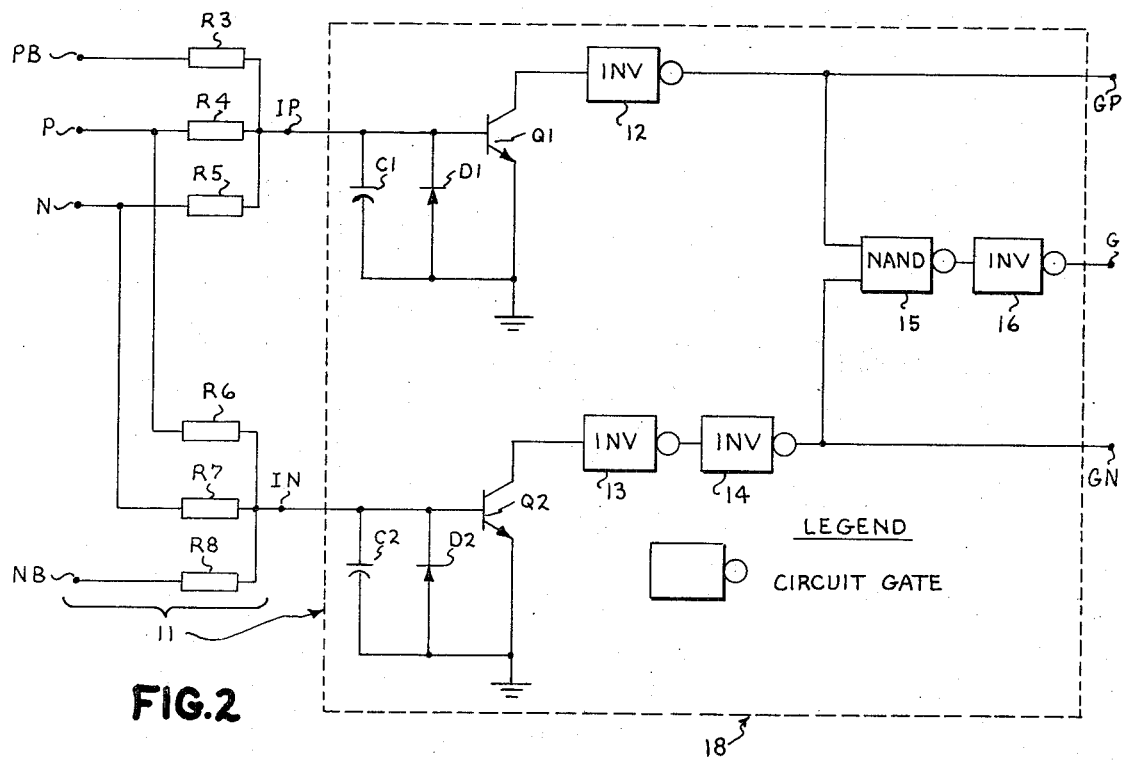
FIG. 2 is a detailed drawing of the FIG. 1 detector incorporating the digital mode of sensing.

FIG. 2 shows the detector 11 of FIG. 1 in detail. In FIG. 2, a positive DC bias is applied via terminal PB and resistor R3 to a gate circuit for the positive DC bus consisting of capacitor C1, diode D1 and transistor Q1. A negative DC bias is applied via terminal NB and resistor R8 to a gate circuit for the negative DC bus consisting of capacitor C2, diode D2 and transistor Q2. Hence, with no other voltage applied to these circuits, transistor Q1 is turned on producing a logic 1 signal at the output of an inverting gate 12 on terminal GP, while transistor Q2 is maintained off resulting in logic 0 at the output of inverting gate 13 which is again inverted to a logic 1 by inverting gate 14, the logic 1 signal appearing at output terminal GN. The two logic 1 signals are also applied to a NAND gate 15 the output of which is inverted by inverting gate 16 to provide a logic 1 signal at output terminal G.

Another voltage, however, is applied to the gate circuits when a resistive path to ground develops. In FIG. 2, terminals P and N are connected to the positive and negative DC buses respectively as shown in FIG. 1. Under normal conditions; i.e., no bus to ground paths, the voltages at terminals P and N are equal in magnitude but opposite in polarity. Thus, under normal conditions, there is no additional voltage applied to either the gate circuit for the positive DC bus via resistors R4 and R5, or the gate circuit for the negative DC bus via resistors R6 and R7, and transistors Q1 and Q2 are maintained on and off respectively by the bias voltages. If a resistive path to ground develops on one of the buses, however, the gate circuit for that bus will be affected as follows. When a resistive path to ground develops on one bus, the bus voltages compared at terminals P and N will become imbalanced in favor of the voltage on the other bus. That is, development of a resistive path to ground on the positive bus will effectively produce a net negative DC voltage at terminals P and N. This net negative voltage will generally make a point IP, located at the input of the gate circuit for the positive bus, negative with respect to ground which will turn transistor Q1, normally on, off thereby producing a logic 0 signal from terminal GP. At the same moment, since point IN, located at the input of the gate circuit for the negative bus is already negative with respect to ground, the net negative DC voltage at terminals P and N will have no affect on transistor Q2 which will remain off leaving a logic 1 signal on terminal GN. With a logic 0 and 1 signal on terminals GP and GN respectively, a logic 0 signal will now appear on terminal G.

Development of a resistive path to ground on the negative bus will result in a net positive voltage at both points IP and IN which, although it will not affect the state of the gate circuit for the positive bus, will turn transistor Q2, normally off, on thereby producing a logic 0 signal at terminal GN. With a logic 0 and 1 signal now on terminal GN and GP respectively, a logic 0 signal will once more appear on terminal G.

From the preceeding discussion it is noted that development of a resistive path to ground on the positive DC bus will produce logic 0 signals on both terminals G and GP while development of a resistive path to ground on the negative DC bus will produce logic 0 signals on terminals G and GN. Gates 12 through 16 are responsible for monitoring the state of the gate circuits and annunciating by these logic 0 signals both a resistive path to ground fault occurrence as well as which bus is faulted. These logic 0 signals are in turn used to drive suitable indicator (e.g., lights) and/or protective circuitry as desired to assist an operator in taking corrective action to eliminate the fault path.

Resistors R4 through R7, connected as shown in FIG. 2, form a simple resistive control network, sensing the imbalance in the bus voltages during the time a fault path exists, by the digital mode of sensing and applying a voltage proportional to this imbalance to the gate circuits at IP and IN during this time.

Figure 3:
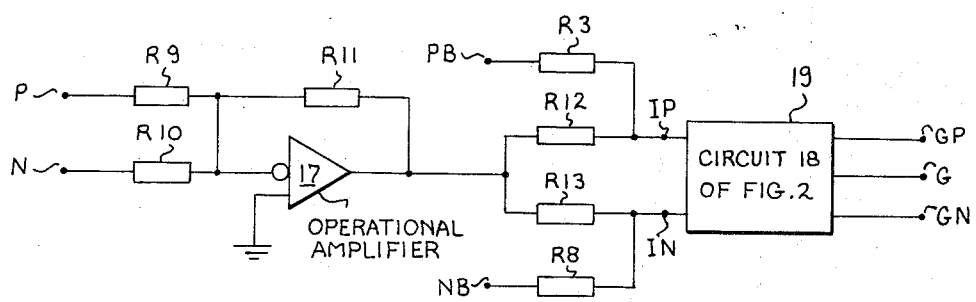
FIG. 3 is a detailed drawing of the FIG. 1 detector for sensing in the analog mode.

In FIG. 3, there is shown an additional embodiment of the present invention for sensing imbalance by an analog mode. In that figure, the resistor network of FIG. 2 ($R_4$–$R_7$), is essentially replaced by resistors R9 through R13 and an operational amplifier 17. The other elements shown therein are the same as the correspondingly labelled elements of FIG. 2, except that a portion 18 of the detector shown enclosed in dashed lines in FIG. 2 has been illustrated as a block 19 in FIG. 3 for simplicity. The control network of FIG. 3, however, applies a voltage to the gate circuits through resistors R12 and R13 in a manner similar to what the resistor network does, when a resistive path to ground fault develops, so that my detector will perform equally well for either mode of fault sensing. That is, the occurrence of a resistive path to ground will cause an imbalance at terminals P and N which in turn varies the output of the operational amplifier 17. The output of amplifier 17 is applied to the points IP and IN with the remaining circuit operation being that as described with respect to FIG. 2.

While the invention has been explained and described with the aid of particular embodiments theroef, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A detector for indicating a resistive path to ground fault on either bus of a pair of ungrounded buses conducting electric power to a load, said detector comprising:
   a. a gate circuit for each of said buses, each gate circuit being capable of operation in either of two modes of operation;
   b. input bias means for each gate circuit for normally operating each circuit in a different one of said modes;
   c. input control means for said gate circuits for comparing the voltages on said buses and applying a signed signal to both of said circuits whenever said voltages become imbalanced as a result of said fault, said signal switching the gate circuit for the faulted bus to the other one of said modes; and,
   d. monitoring means for said gate circuits for annunciating said switching.

2. The detector in accordance with claim 1 in which said input control means comprises a resistor network including a resistor connected between each of said buses and each of said gate circuits.

3. The invention in accordance with claim 1 wherein said input control means includes an operational amplifier the output of which varies in accordance with the nature of said fault.

4. A detector for indicating a resistive path to ground fault on either bus of a pair of ungrounded DC buses conducting electric power to a load, said pair comprising a positive and a negative bus, said detector comprising:
   a. a first and a second gate circuit for the positive and negative bus respectively, said circuits being capable of operation in either of two modes of operation;
   b. input bias means for each circuit for normally operating each in a different one of said modes, one bias means inputting a positive DC signal to said first circuit and the other inputting a negative DC signal to said second circuit;
   c. input control means for said gate circuits for comparing the voltages on said buses and applying an additional signal to both of said circuits whenever said voltages become imbalanced as a result of a fault, a negative additional signal indicative of said fault on said positive bus switching said first circuit to the other one of said modes and a positive additional signal indicative of said fault on said negative bus switching said second circuit to the other one of said modes; and,
   d. monitoring means for said circuits for annunciating said switching.

5. The detector in accordance with claim 4 in which said input control means comprises a resistor network including a resistor connected between each of said buses and each of said gate circuits.

6. The invention in accordance with claim 4 wherein said input control means includes an operational amplifier the output of which varies in accordance with the nature of said ground fault.

* * * * *